L. G. HURD.
HATPIN FASTENER.
APPLICATION FILED NOV. 11, 1920.

1,394,304.

Patented Oct. 18, 1921.

WITNESSES.
Chas. A. Lawson
Charles H. Hopkins

INVENTOR.
Leigh G. Hurd.
By Leigh G. Hurd.

UNITED STATES PATENT OFFICE.

LEIGH G. HURD, OF LOS ANGELES, CALIFORNIA.

HATPIN-FASTENER.

1,394,304.  Specification of Letters Patent.  Patented Oct. 18, 1921.

Application filed November 11, 1920. Serial No. 423,335.

*To all whom it may concern:*

Be it known that I, LEIGH G. HURD, a citizen of the United States, residing at Los Angeles, in the county of Los Angeles and State of California, have invented new and useful Improvements in Hatpin-Fasteners, of which the following is a specification.

My invention relates to improvements in hat-pin fasteners, and particularly to hat-pin fasteners of simple construction and that can be attached to ordinary hat pins in common use, and that will prevent the loss or theft of the hat-pins.

Another object is to provide a hat-pin fastener that can be cheaply manufactured and that is perfect in operation. Other objects will appear hereinafter.

Figure 1:
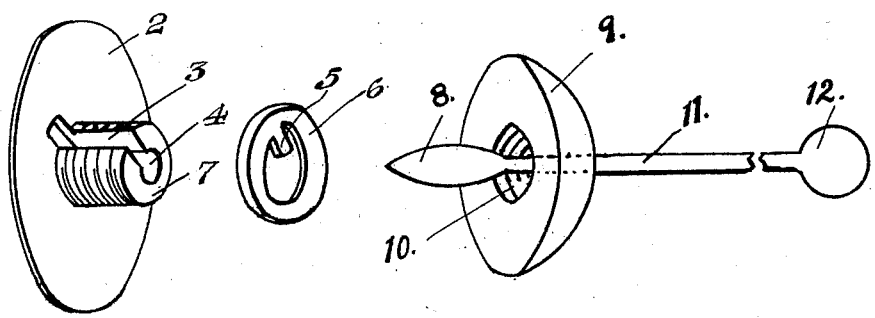
Figure 2:
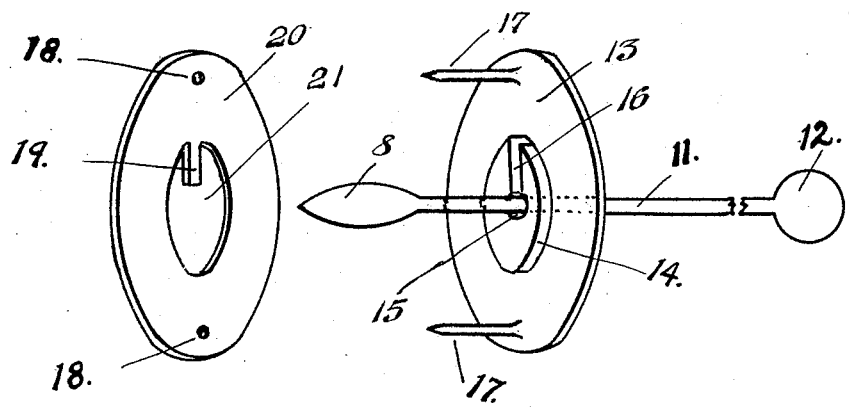

My invention is illustrated in the accompanying drawings in which:

Figure 1, is a perspective view illustrating the modified form of my invention. Fig. 2, is a perspective view illustrating the preferred form of my invention.

Referring to the drawings, 11 indicates the shank of an ordinary hat-pin with a head 12, the pointed end of the shank having a flattened and broadened end adjacent to the point, as shown at 8 in both figures.

The flattened and broadened end 8 is of a greater diameter than the shank 11. In the preferred form of my invention as shown in Fig. 2 a plate or disk 13, has a hub 14 having a central opening 15 of a diameter to slidably support the hat-pin shank 11, and a longitudinal slot 16 which extends through the wall of the hub 14 and into the central opening 15 through its entire length. A thin plate 20 having a central opening 21 and a projection 19, when fitted on the hub 14 on the plate 13 will prevent the withdrawal of the hat-pin 11 having a flattened and broadened end 8 adjacent to its point, and which has been inserted in the orifice 15 and slot 16 previous to placing the two plates together.

Plates 13 and 20 are held together and in position, and also attached to the wall of a hat by means of the prongs or wires 17 which are permanently attached to the plate 13, said wires or prongs 17 fit into the openings 18 on plate 20.

In the operation of my invention an ordinary hat-pin having a flattened and broadened end 8, a shank 11 and a head 12, as shown in Fig. 2, is inserted through the opening 15 and slot 16. The plate 20 is now positioned on the hub 14 with the wires or prongs 17 protruding through the openings 18. It will be seen that when the two plates 20 and 13 are together in this position, the withdrawal of the hat-pin is prevented as the projection 19 fits into the slot 16, thereby changing the elongated opening into a circular one, which slidably supports the hat-pin shank 11 but will not let the flattened and broadened end 8 pass therethrough.

After the fastener is attached to the hat-pin in the manner just described, the hat-pin is inserted at the desired point in the hat and the wires or prongs 17 are pushed through the hat also and bent over to hold the hat-pin and fastener against removal. If it is desired to not have the fastener show from an outside view, the hat-pin would first be inserted in the hat crown and the fastener attached to the hat-pin inside of the hat and in the opposite position as just described.

In the modified form of my invention shown in Fig. 1, a hat-pin with a flattened and broadened end 8 adjacent to its point is passed through an internally threaded opening 10 in a nut 9, which screws on an externally threaded hub 7 having a shoulder or back plate 2. The back plate 2 and hub 7 has a central opening 4 which slidably supports the hat-pin shank 11. In order to let the flattened and broadened end 8 of the hat-pin pass through the hub 7 and back plate 2, a slot 3 is cut through the wall of the hub 7 into the central opening 4 through its entire length and also through the back plate 2. A ring or washer 6 having a projection 5 is intended to fit over the hub 7, the projection 5 fitting into the slot 3 making a central opening at the point the washer 6 encircles.

In the operation of the fastener shown in Fig. 1, a hat-pin with a flattened and broadened end 8 adjacent to its point is inserted through the nut 9 and then inserted in the hat. The ring or washer 6 is then positioned over the hat-pin inside of the hat, after which the flattened and broadened end of the hat-pin is passed through the central opening 4 and slot 3. The nut 9 is now screwed on the hub 7, the withdrawal of the pin being prevented by the projection 5 on the washer 6.

Any ordinary hat-pin can be used in my fasteners as all that is necessary is to slightly flatten the end adjacent to the point. Another advantage of my invention is that the hat-pin can be detached from the device when desired, which makes it unnecessary to have a separate fastener for every hat-pin.

Having thus described my invention, what I claim is:

1. A hat-pin fastener comprising the combination of a hat-pin having a pointed shank formed with a flattened and broadened end adjacent to the point, and a member formed with a hub, said member and hub having an opening through the center of same of such a size that the flattened and broadened end of the hat-pin can pass therethrough, and means coöperating with said member and hub in forming a circular opening in the fastener that slidably and detachably supports the hat-pin shank, but of such a diameter that the flattened and broadened end of the hat-pin cannot pass therethrough, and means for detachably attaching said fastener and a hat-pin to a hat.

2. A hat-pin fastener comprising the combination of a hat-pin having a pointed shank formed with a flattened and broadened end adjacent to the point, and a member having a hub with a slotted central opening through which a hat-pin with a flattened and broadened end can pass, and a washer with an internal projection which fits over said hub and into said slot in the hub, forming a circular opening in the fastener at the point the washer encircles, which slidably and detachably supports and fits the hat-pin shank and prevents the withdrawal of the flattened and broadened end of the hat-pin when attached to a hat, and means for detachably attaching said fastener and a hat-pin to a hat.

In testimony whereof I have signed my name to this specification.

LEIGH G. HURD.